(12) United States Patent
Na et al.

(10) Patent No.: US 10,083,773 B2
(45) Date of Patent: Sep. 25, 2018

(54) GRAPHENE, COMPOSITION FOR PREPARING GRAPHENE, AND METHOD OF PREPARING GRAPHENE USING THE COMPOSITION

(71) Applicant: Hanwha Techwin Co., Ltd., Changwon-si (KR)

(72) Inventors: Dukhwa Na, Changwon-si (KR); Dongkwan Won, Changwon-si (KR); Euisoo Park, Changwon-si (KR); Jaechul Ryu, Changwon-si (KR)

(73) Assignee: HANWHA AEROSPACE CO., LTD, Changwon-si (KR)

(*) Notice: Subject to any disclaimer, the term of this patent is extended or adjusted under 35 U.S.C. 154(b) by 0 days.

(21) Appl. No.: 14/655,461

(22) PCT Filed: Dec. 24, 2013

(86) PCT No.: PCT/KR2013/012058
§ 371 (c)(1),
(2) Date: Jun. 25, 2015

(87) PCT Pub. No.: WO2014/104693
PCT Pub. Date: Jul. 3, 2014

(65) Prior Publication Data
US 2015/0348666 A1 Dec. 3, 2015

(30) Foreign Application Priority Data
Dec. 26, 2012 (KR) ........................ 10-2012-0153705

(51) Int. Cl.
*H01B 1/04* (2006.01)
*B82Y 40/00* (2011.01)
*H01B 1/24* (2006.01)
*B32B 9/00* (2006.01)
*B32B 9/04* (2006.01)
*C01B 32/184* (2017.01)
*C01B 32/186* (2017.01)
*C01B 32/194* (2017.01)

(52) U.S. Cl.
CPC .............. *H01B 1/04* (2013.01); *B32B 9/007* (2013.01); *B32B 9/04* (2013.01); *C01B 32/184* (2017.08); *C01B 32/186* (2017.08); *C01B 32/194* (2017.08); *B32B 2307/202* (2013.01); *B32B 2457/00* (2013.01); *B32B 2457/20* (2013.01); *Y10T 156/10* (2015.01)

(58) Field of Classification Search
CPC .................................. H01B 1/04; H01B 1/24
USPC .................. 252/500, 510, 511, 502
See application file for complete search history.

(56) References Cited

U.S. PATENT DOCUMENTS

| 8,124,966 | B2 | 2/2012 | Lazarev | |
|---|---|---|---|---|
| 8,575,335 | B2 | 11/2013 | Jeon et al. | |
| 8,715,532 | B2 | 5/2014 | Shin et al. | |
| 8,912,530 | B2 | 12/2014 | Yang et al. | |
| 2011/0127471 | A1* | 6/2011 | Shin | B82Y 30/00 252/506 |
| 2011/0240980 | A1* | 10/2011 | Wei | B82Y 10/00 257/40 |
| 2013/0130011 | A1 | 5/2013 | Hong et al. | |
| 2013/0309475 | A1 | 11/2013 | Veerasamy | |
| 2014/0054550 | A1 | 2/2014 | Hong et al. | |
| 2014/0154770 | A1* | 6/2014 | Vittadello | G01N 33/551 435/177 |

FOREIGN PATENT DOCUMENTS

| CN | 101575095 A | | 11/2009 | |
|---|---|---|---|---|
| CN | 101985354 A | * | 3/2011 | ............. C01B 31/04 |
| CN | 102061109 A | * | 5/2011 | ............. C01B 31/04 |
| CN | 102296361 A | * | 12/2011 | ............. C01B 31/04 |
| CN | 102583356 A | | 7/2012 | |
| CN | 102737851 A | | 10/2012 | |
| JP | 2010508677 A | | 3/2010 | |
| KR | 10-2009-0059871 A | | 6/2009 | |
| KR | 10-2011-0061909 A | | 6/2011 | |
| KR | 10-2011-0095751 A | | 8/2011 | |
| KR | 10-2012-0012271 A | | 2/2012 | |
| KR | 10-2012-0013604 A | | 2/2012 | |
| KR | 1020120064980 A | | 6/2012 | |
| KR | 10-2012-0073948 A | | 7/2012 | |
| KR | 10-2012-0080168 A | | 7/2012 | |
| KR | 10-2012-0099910 A | | 9/2012 | |
| KR | 10-2012-0127070 A | | 11/2012 | |

OTHER PUBLICATIONS

Ai ("Benzoxazole and benzimidazole heterocycle-grafted graphene for high-performance supercapacitor electrodes." J. Mater. Chem, 22, pp. 23439-23446, pub Oct. 8, 2012).*
Liu ("Simultaneous catalyzing and reinforcing effects of imidazole-functionalized graphene in anhydride-cured epoxies." J. Mater. Chem, 22, pp. 18395-18402, pub Jul. 9, 2012).*
Communication dated Jul. 13, 2016 issued by the State Intellectual Property Office of P.R. China in counterpart Chinese Application No. 201380068566.1.
International Search Report (PCT/ISA/210) dated Feb. 10, 2014, issued in International Application No. PCT/KR2013/012058.
Written Opinion (PCT/ISA/237) dated Feb. 10, 2014, issued in International Application No. PCT/KR2013/012058.
Notice of Allowance dated Feb. 26, 2018, issued by the Korean Intellectual Property Office in counterpart Korean Application No. 10-2012-0153705.

* cited by examiner

Primary Examiner — Tri V Nguyen
(74) Attorney, Agent, or Firm — Sughrue Mion, PLLC (57) ABSTRACT

Graphene, a composition for preparing graphene, and a method of preparing graphene using the composition are disclosed.

1 Claim, 4 Drawing Sheets

GRAPHENE, COMPOSITION FOR PREPARING GRAPHENE, AND METHOD OF PREPARING GRAPHENE USING THE COMPOSITION

CROSS-REFERENCE TO RELATED APPLICATION

This application claims the benefit of Korean Patent Application No. 10-2012-0153705, filed on Dec. 26, 2012, in the Korean Intellectual Property Office, the disclosure of which is incorporated herein in its entirety by reference.

BACKGROUND

1. Field

One or more exemplary embodiments relate to graphene, a composition for preparing graphene, and a method of preparing graphene using the composition.

2. Description of the Related Art

Developments of new materials are actively being progressed in various electronic device fields such as display devices and solar cells. Particularly, studies are being actively progressed on new materials that are capable of replacing indium tin oxides (ITOs) mainly used as a transparent electrode of an electronic device. Studies are being intensively made on carbon-containing materials among the new materials, e.g., carbon nanotubes, diamond, graphite, graphene, or the like.

Particularly, since graphene is excellent in terms of electric conductivity and transparency, various methods of preparing graphene have been suggested. The methods of preparing graphene may largely be divided into mechanical methods and chemical methods for preparing graphene. The mechanical methods of preparing graphene may include methods of detaching graphene from a graphite sample using a scotch tape. Such methods using a scotch tape may prevent damage of a surface of graphene, but are not suitable for upsizing graphene. The CVD method is a method of injecting a vapor phased carbon supply source into a container in which a metal catalyst is disposed, heating the container, and then cooling the heated container again to grow a graphene sheet on the surface of the metal catalyst. The CVD method may also involve a step of removing the metal catalyst. Methods typically used for removing the metal catalyst (e.g., etching with a salt solution) in the related art may damage the surface of graphene, and thus a graphene sheet having a low sheet resistance value may not be easily formed.

SUMMARY

One or more exemplary embodiments include graphene having a low sheet resistance value, a composition for preparing graphene, and a method of preparing graphene using the composition.

Additional aspects will be set forth in part in the description which follows and, in part, will be apparent from the description, or may be learned by practice of the presented embodiments.

According to one or more exemplary embodiments, graphene includes a nitrogen-containing organic compound.

According to one or more exemplary embodiments, a composition for preparing graphene includes a nitrogen-containing organic compound; an oxidizing agent; and an acid.

According to one or more exemplary embodiments, a method of preparing graphene includes doping graphene with a composition for preparing graphene to obtain a doped graphene, the composition including a nitrogen-containing organic compound, an oxidizing agent, and an acid.

According to one or more exemplary embodiments, a method of preparing graphene includes: forming graphene on at least one side of a metal catalyst; and removing the metal catalyst and doping the graphene at the same time with a composition for preparing graphene to obtain a doped graphene, the composition including a nitrogen-containing organic compound, an oxidizing agent, and an acid.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, graphene, a composition for preparing graphene, and a method of preparing graphene using the composition according to an exemplary embodiment of the present inventive concept are described more in detail.

The term "graphene" used in the present specification refers to multiple carbon atoms connected to one another by a covalent bond such that the carbon atoms are formed in a two-dimensional film form (normally $sp^2$ bond). The carbon atoms composing graphene form a 6-membered ring as a basic repeating unit, but may additionally include a 5-membered ring and/or a 7-membered ring. According to amount(s) of the 5-membered ring and/or the 7-membered ring that may be contained in graphene, the form of graphene may be varied. Graphene may be formed in a single layer, but multiple single layers may be laminated to form a multi-layer. Here, the layer of graphene may have a maximum thickness of about 100 nm.

The term "a composition for preparing graphene" used in the present specification refers to a composition that removes a metal catalyst used in the preparation of graphene and/or that is used in doping graphene.

The term "a laminate" used in the present specification refers to a plurality of layers, i.e., a state of additionally including one or more of a metal catalyst, a carrier film, and a target film besides graphene depending on the respective steps of a method of preparing graphene according to an exemplary embodiment of the present inventive concept.

According to an aspect of the present inventive concept, graphene may include a nitrogen-containing organic compound. The nitrogen-containing organic compound is a carbon compound containing a nitrogen atom, and types of the nitrogen-containing organic compound is not particularly limited so long as a sheet resistance value of graphene may be lowered. The nitrogen-containing organic compound may be chemically and/or physically bonded to the surface of graphene, and may be chemically and/or physically bonded between multiple layers composing graphene, but the nitrogen-containing organic compound is not limited thereto. That is, if a sheet resistance value of graphene may be lowered, bonding positions or bonding methods of the nitrogen-containing organic compound are not limited.

In the case of doping graphene using a metal salt such as $AuCl_3$, a sheet resistance value of graphene may be lowered while transmittance of graphene may be lowered. Meanwhile, in the case of doping graphene using an acid such as $HNO_3$, a sheet resistance value of graphene may be lowered while transmittance of graphene may also be maintained. However, such doping effects may not be lasted for a long time.

However, in the case of doping graphene using the nitrogen-containing organic compound, a sheet resistance value of graphene may be lowered while transmittance of graphene may be maintained. In addition, the lowered sheet resistance value of graphene may be maintained for a long time.

For example, the nitrogen-containing organic compound may be at least one substituted or unsubstituted $C_2$-$C_{60}$ heteroaryl group, but is not limited thereto.

For example, the nitrogen-containing organic compound may be at least one selected from a substituted or unsubstituted pyrrole, a substituted or unsubstituted imidazole, a substituted or unsubstituted pyrazole, a substituted or unsubstituted pyridine, a substituted or unsubstituted pyrazine, a substituted or unsubstituted pyrimidine, a substituted or unsubstituted pyridazine, a substituted or unsubstituted indole, a substituted or unsubstituted quinoline, a substituted or unsubstituted benzoquinoline, a substituted or unsubstituted benzimidazole, a substituted or unsubstituted triazine, and a substituted or unsubstituted carbazole, but the nitrogen-containing organic compound is not limited thereto.

For example, the nitrogen-containing organic compound may be at least one selected from a pyrrole, an imidazole, a pyrazole, a pyridine, a pyrazine, a pyrimidine, a pyridazine, an indole, a quinoline, a benzoquinoline, a benzimidazole, a triazine, and a carbazole; and a pyrrole, an imidazole, a pyrazole, a pyridine, a pyrazine, a pyrimidine, a pyridazine, an indole, a quinoline, a benzoquinoline, a benzimidazole, a triazine, and a carbazole, each substituted with at least one of a deuterium, a halogen atom, a methyl group, an ethyl group, an n-propyl group, an i-propyl group, an n-butyl group, an i-butyl group, and a t-butyl group, but the nitrogen-containing organic compound is not limited thereto.

For example, the nitrogen-containing organic compound may be at least one selected from an imidazole and a benzimidazole; and an imidazole and a benzimidazole, each substituted with at least one of a deuterium, a methyl group, and an ethyl group, but the nitrogen-containing organic compound is not limited thereto.

For example, the nitrogen-containing organic compound may be at least one selected from an imidazole, a benzimidazole, a 5,6-dimethylbenzimidazole, and a 1,2-dimethylbenzimidazole, but the nitrogen-containing organic compound is not limited thereto.

The graphene doped with the nitrogen-containing organic compound may have a sheet resistance value of about more than 0 Ω/sq to about 300 Ω/sq or less, e.g., about 100 Ω/sq to about 200 Ω/sq.

In an exemplary embodiment, the graphene doped with the nitrogen-containing organic compound may be used to replace an existing ITO electrode, but graphene is not limited thereto. Specifically, the graphene may be used as a transparent electrode, and more specifically, the graphene may be used as a transparent electrode for touch panels. In addition, the graphene may be used as an electrode for a solar cell.

According to another aspect of the present inventive concept, a composition for preparing graphene may include a nitrogen-containing organic compound; an oxidizing agent; and an acid. When a composition including both a nitrogen-containing organic compound and an acid is used for the preparation of graphene, a sheet resistance value of graphene may be lowered. For example, when a composition including a nitrogen-containing organic compound but not including an acid is used for the preparation of graphene, a sheet resistance value of graphene may not be lowered. That is, a composition including only a nitrogen-containing organic compound is used for the preparation of graphene, graphene may not be doped.

The nitrogen-containing organic compound may have a function to lower a sheet resistance value of graphene. The nitrogen-containing organic compound may be at least one selected from a substituted or unsubstituted $C_2$-$C_{60}$ heteroaryl group, but the nitrogen-containing organic compound is not limited thereto.

For example, the nitrogen-containing organic compound may be at least one selected from a substituted or unsubstituted pyrrole, a substituted or unsubstituted imidazole, a substituted or unsubstituted pyrazole, a substituted or unsubstituted pyridine, a substituted or unsubstituted pyrazine, a substituted or unsubstituted pyrimidine, a substituted or unsubstituted pyridazine, a substituted or unsubstituted indole, a substituted or unsubstituted quinoline, a substituted or unsubstituted benzoquinoline, a substituted or unsubstituted benzimidazole, a substituted or unsubstituted triazine, and a substituted or unsubstituted carbazole, but the nitrogen-containing organic compound is not limited thereto. For example, the nitrogen-containing organic compound may be at least one selected from: a pyrrole, an imidazole, a pyrazole, a pyridine, a pyrazine, a pyrimidine, a pyridazine, an indole, a quinoline, a benzoquinoline, a benzimidazole, a triazine, and a carbazole; and a pyrrole, an imidazole, a pyrazole, a pyridine, a pyrazine, a pyrimidine, a pyridazine, an indole, a quinoline, a benzoquinoline, a benzimidazole, a triazine, and a carbazole, each substituted with at least one of a deuterium, a halogen atom, a methyl group, an ethyl group, an n-propyl group, an i-propyl group, an n-butyl group, an i-butyl group, and a t-butyl group, but the nitrogen-containing organic compound is not limited thereto.

For example, the nitrogen-containing organic compound may be at least one selected from: an imidazole and a benzimidazole; and an imidazole and a benzimidazole, each substituted with at least one of a deuterium, a methyl group, and an ethyl group, but the nitrogen-containing organic compound is not limited thereto.

For example, the nitrogen-containing organic compound may be at least one selected from an imidazole, a benzimidazole, a 5,6-dimethylbenzimidazole, and a 1,2-dimethylbenzimidazole, but the nitrogen-containing organic compound is not limited thereto.

The oxidizing agent may be at least one selected from $H_2O_2$, $(NH_4)S_2O_8$, HClO, and $ClO_4$, but the oxidizing agent is not limited thereto. For example, the oxidizing agent may be $H_2O_2$. In addition, the oxidizing agent may be introduced in a solid form into the composition for preparing graphene, or the oxidizing agent may be introduced in a state that the oxidizing agent is diluted into a solvent such as water.

The acid may be at least one selected from $H_2SO_4$, $HNO_3$, $H_3PO_4$, HCl, and $CH_3COOH$, but the acid is not limited thereto. The acid may be introduced into the composition for preparing graphene in a state that the acid is diluted into a solvent such as water. For example, the acid may be a 95 wt % aqueous sulfuric acid solution or an 85 wt % aqueous phosphoric acid solution.

The composition for preparing graphene may include about 0.2 wt % to about 10 wt % of the nitrogen-containing organic compound, about 1 wt % to about 10 wt % of the oxidizing agent, about 2 wt % to about 30 wt % of the acid, and a balance of a solvent. However, the composition for preparing graphene composition for preparing graphene is not limited thereto. In the present specification, contents of the nitrogen-containing organic compound, the oxidizing agent, and the acid are based on total weights of the composition for preparing graphene. The composition for preparing graphene may include, for example, about 0.5 wt % or more, about 1 wt % or more, about 2.5 wt % or less, or about 2 wt % or less of the nitrogen-containing organic compound. The composition for preparing graphene may include, for example, about 2 wt % or more, about 3 wt % or more, about 9 wt % or less, or about 8 wt % or less of the oxidizing agent. The composition for preparing graphene may include, for example, about 3 wt % or more, about 5 wt % or more, about 18 wt % or less, or about 15 wt % or less of the acid.

Water may be used as a solvent of the composition for preparing graphene. That is, the composition for preparing graphene may be an aqueous solution of a nitrogen-containing organic compound, an oxidizing agent, and an acid. However, materials are not particularly limited if the solvent includes any materials that are capable of homogeneously dispersing the oxidizing agent and acid. Therefore, besides water, the solvent may additionally include other liquids that are compatible with water. Alternatively, the solvent may additionally include an organic solvent such as tetrahydrofuran to disperse the nitrogen-containing organic compound homogeneously.

The composition for preparing graphene may additionally include additives, and any additives widely known in the art may be used in the present inventive concept. For example, the additives include a dispersant, a storage stabilizer, a stabilizer, and mixtures thereof. The additives may be contained in amount ranges of about 3 wt % to about 20 wt % based on the total weight of the composition for preparing graphene.

The nitrogen-containing organic compound, the oxidizing agent, the acid, and the solvent are mixed in-situ such that the mixture may be used as the composition for preparing graphene. Alternatively, after mixing the nitrogen-containing organic compound, the oxidizing agent, the acid, and the solvent to prepare a composition, the prepared composition may be stored and used. Particularly, when the prepared composition is stored and used after mixing the nitrogen-containing organic compound, the oxidizing agent, the acid, and the solvent to prepare a composition, the composition for preparing graphene may additionally include additives such as a dispersant, a storage stabilizer, or the like. In addition, when the composition for preparing graphene includes $H_2O_2$ as the oxidizing agent, the composition for preparing graphene may additionally include additives such as a stabilizer for controlling the oxidation reaction of $H_2O_2$.

Figure 1:
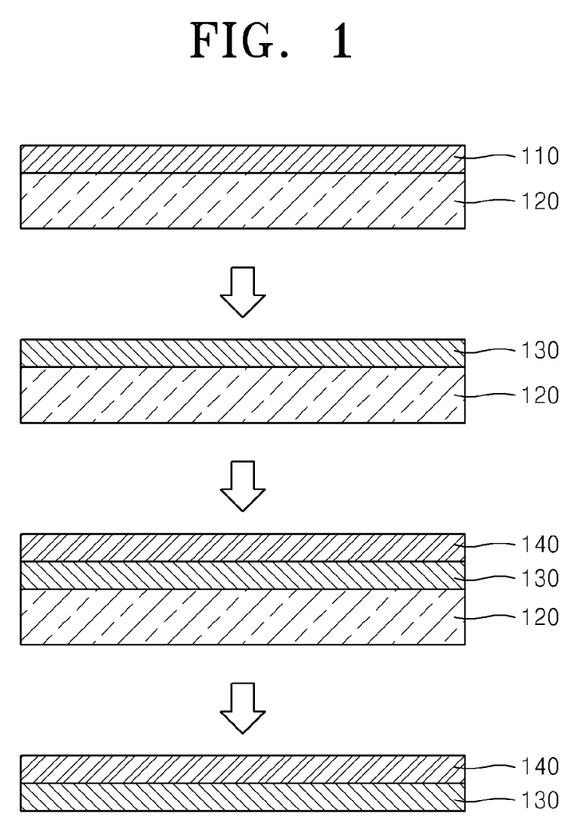
FIG. 1 is a diagram schematically illustrating a method of preparing graphene according to an exemplary embodiment of the present inventive concept.

FIG. 1 is a diagram schematically illustrating a method of preparing graphene according to an exemplary embodiment. Hereinafter, a method of preparing graphene is described as follows by referring to FIG. 1.

A carrier film 120 is combined with one side of graphene 110.

Any types of the carrier film 120 may be used if the carrier film 120 supports the graphene 110 to facilitate transfer of the graphene 110, maintains the shape of the graphene 110, and prevents damages of the graphene 110. For example, the carrier film 120 may be a thermal release tape or a polymer support, but the carrier film 120 is not limited thereto. Although one side of the thermal release tape has adhesive property at room temperature, the thermal release tape has properties of loosing adhesive property at a predetermined temperature or higher. The polymer support includes polymers such as polymethylmethacrylate (PMMA), and the polymer may be removed by an organic solvent at a desired time after forming a polymer on one side of the graphene 110 by a solution process.

A laminate of the graphene 110 and the carrier film 120 is doped with a composition for preparing graphene including the nitrogen-containing organic compound, the oxidizing agent, and the acid, to obtain doped graphene 130.

Functions, types, using forms, or contents of the nitrogen-containing organic compound, the oxidizing agent, and the acid are referred to the above-mentioned composition for preparing graphene.

Any steps of obtaining the doped graphene 130 may be used if the steps are capable of obtaining doped graphene. For example, the step may be performed by impregnating the laminate of the graphene 110 and the carrier film 120 with the composition for preparing graphene or by spraying the composition for preparing graphene onto the laminate of the graphene 110 and the carrier film 120.

The doped graphene 130 is transferred onto a target film 140.

The target film 140 may be a portion of a device to which the doped graphene 130 is applied, and specifically may be one surface of an electrode of the device.

To transfer the doped graphene 130 onto the target film 140, the laminate of the graphene 110 and the carrier film 120 is combined with the target film 140, and then, the carrier film 120 is removed. For example, when the carrier film 120 is a thermal release tape, the thermal release tape is detached from the doped graphene 130 by applying a force to the doped graphene 130 at a predetermined temperature or higher at which the thermal release tape looses adhesive property. For example, when the carrier film 120 is a polymer support, an organic solvent such as acetone is applied to the polymer support to remove the polymer support from the doped graphene 130.

Figure 2:
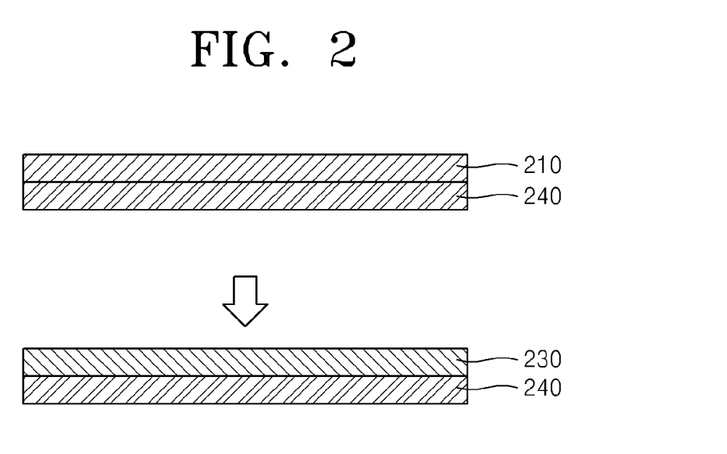
FIG. 2 is a diagram schematically illustrating a method of preparing graphene according to another exemplary embodiment of the present inventive concept.

FIG. 2 is a diagram schematically illustrating a method of preparing graphene according to another exemplary embodiment. Hereinafter, a method of preparing graphene is described as follows by referring to FIG. 2.

A target film 240 is combined with one side of graphene 210.

A description of the target film 240 is referred to the description of the target film 140 of FIG. 1.

A laminate of the graphene 210 and the target film 240 is doped with a composition for preparing graphene including the nitrogen-containing organic compound, the oxidizing agent, and the acid, to obtain doped graphene 230.

Functions, types, using forms, contents, etc of the nitrogen-containing organic compound, the oxidizing agent, and the acid are referred to the above-mentioned composition for preparing graphene.

A description on the step of obtaining the doped graphene 230 is referred to the description on the step of obtaining the doped graphene 130 of FIG. 1.

Figure 3:
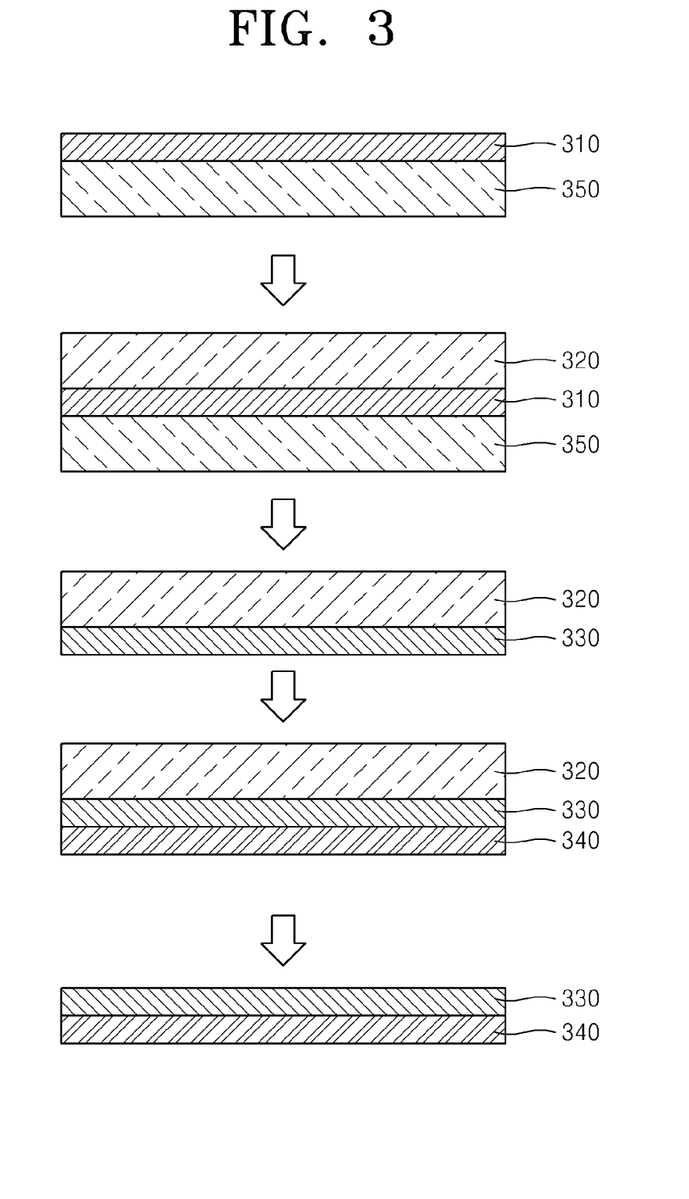
FIG. 3 is a diagram schematically illustrating a method of preparing graphene according to another exemplary embodiment of the present inventive concept.

FIG. 3 is a diagram schematically illustrating a method of preparing graphene according to another exemplary embodiment. Hereinafter, a method of preparing graphene is described as follows by referring to FIG. 3.

Although it is not illustrated in the drawing, a metal catalyst 350 is pretreated.

The metal catalyst 350 may be used as a place at which graphene is grown. Forms of the metal catalyst 350 are not limited if the graphene is grown at the metal catalyst 350. For example, the metal catalyst 350 may be a sheet, a substrate, or a film.

The metal catalyst 350 may be at least one selected from copper (Cu), nickel (Ni), cobalt (Co), iron (Fe), platinum (Pt), gold (Au), silver (Ag), aluminum (Al), chromium (Cr), magnesium (Mg), manganese (Mn), molybdenum (Mo), rhodium (Rh), silicon (Si), tantalum (Ta), titanium (Ti), tungsten (W), uranium (U), vanadium (V), palladium (Pd), yttrium (Y), zirconium (Zr), germanium (Ge) and alloys thereof, but the metal catalyst 350 is not limited thereto.

The metal catalyst 350 may be a single layer, or may be an outermost layer of a multilayer substrate consisting of two or more layers.

A hydrogen gas may be used in a process of pretreating the metal catalyst 350 to remove foreign materials present on the surface of the metal catalyst 350. In addition, the process of pretreating the metal catalyst 350 may reduce defects of graphene during the formation of graphene by cleaning the surface of the metal catalyst 350 by using an acid, an alkali solution, or the like. The process of cleaning the surface of the metal catalyst 350 may be omitted as occasion demands.

Graphene 310 is formed on at least one side of the metal catalyst 350.

Steps of forming the graphene 310 on the at least one side of the metal catalyst 350 are not limited to particular methods. For example, various processes such as chemical vapor deposition (CVD), thermal chemical vapor deposition (TCVD), rapid thermal chemical vapor deposition (RTCVD), inductive coupled plasma chemical vapor deposition (ICP-CVD), and atomic layer deposition (ATLD) may be used in the step. Non-limiting examples of the step may include CVD.

CVD is a method of growing a graphene sheet on the surface of the metal catalyst by cooling the heated container again after injecting a vapor phased carbon supply source into a container in which a metal catalyst is disposed and heating the container.

The vapor phased carbon supply source may be carbon monoxide, ethane, ethylene, ethanol, acetylene, propane, butane, butadiene, pentane, pentene, cyclopentadien, hexane, cyclohexane, benzene, toluene, or mixtures of two or more thereof. Such a vapor phased carbon supply source is separated into carbon atoms and hydrogen atoms at a high temperature. The separated carbon atoms are deposited onto the heated metal catalyst 350, and a graphene 310 is formed while the metal catalyst 350 is being cooled.

The graphene 310 may be formed on at least side of the metal catalyst 350. As shown in FIG. 3, the graphene 310 may be formed on one side of the metal catalyst 350, but the formation of the graphene 310 is not limited thereto. The graphene 310 may also be formed on both sides of the metal catalyst 350.

A carrier film 320 is formed on one side of the graphene 310 on which is the metal catalyst 350 is formed.

A description on the carrier film 320 is referred to the description on the carrier film 120 of FIG. 1.

A doped graphene 330 is obtained by applying a composition for preparing graphene including the nitrogen-containing organic compound, the oxidizing agent and the acid to a laminate of a carrier film 320, a graphene 310 and a metal catalyst 350, thereby removing the metal catalyst 350 and doping the graphene 310 at the same time.

Since the metal catalyst 350 is removed and the graphene 330 is doped at the same time, the doped graphene 330 may be economically prepared. That is, a cost for preparing the doped graphene is reduced since the method may omit a preparation process of one step compared to a method of removing the metal catalyst and then doping the graphene. In addition, a lowered sheet resistance value of the doped graphene 330 may be maintained for a long time by using the composition for preparing graphene.

The step of simultaneously removing the metal catalyst 350 and doping the graphene 310 to obtain the doped graphene 330 may be performed for about 3 minutes to about 60 minutes. For example, the composition for preparing graphene may simultaneously remove the metal catalyst 350 and dope the graphene 310 within a time range of about 3 minutes to about 60 minutes, e.g., about 3 minutes to about 15 minutes, or about 5 minutes to about 10 minutes. Since the graphene 310 may be sufficiently doped while the metal catalyst 350 is substantially completely removed when applying a time range of about 3 minutes to about 60 minutes, a sheet resistance value of the doped graphene 330 obtained may be lowered to the maximum. A time range of using the composition for preparing graphene may be appropriately controlled according to circumstances.

The composition for preparing graphene may be used in an amount of about 500 mL to about 1,000 mL per about 50 g of the metal catalyst 350.

The doped graphene 330 is transferred onto a target film 340.

To transfer the doped graphene 330 onto the target film 340, a method of combining a laminate of the graphene 310 and the carrier film 320 with the target film 340 is referred to the description of FIG. 1.

A description on the target film 340 is referred to the target film 140 of FIG. 1.

Figure 4:
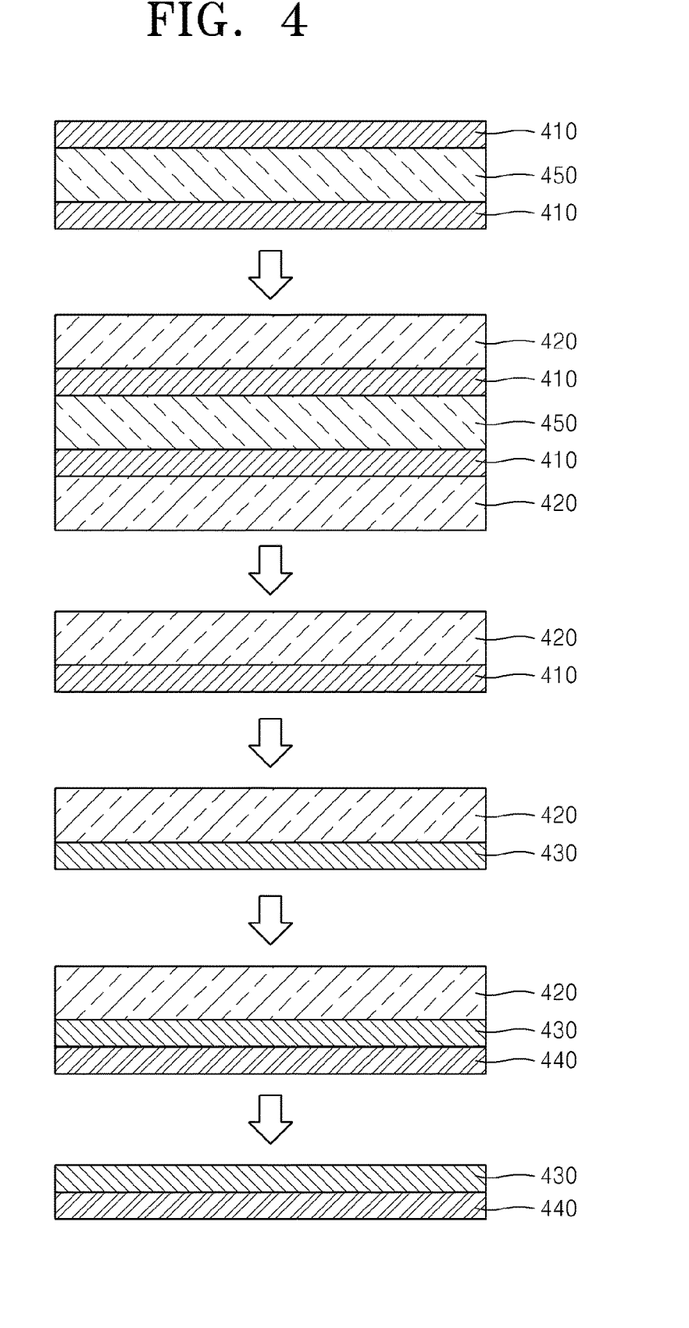
FIG. 4 is a diagram schematically illustrating a method of preparing graphene according to another exemplary embodiment of the present inventive concept.

FIG. 4 is a diagram schematically illustrating a method of preparing graphene according to another exemplary embodiment. Hereinafter, a method of preparing graphene is described as follows by referring to FIG. 4.

Although it is not illustrated in the drawing, a metal catalyst 450 is pretreated.

A description on the step of pretreating the metal catalyst 450 is referred to the description on the step of pretreating the metal catalyst 350 of FIG. 3.

A graphene 410 is formed on at least one side of the metal catalyst 450.

A description on the step of forming the graphene 410 on the at least one side of the metal catalyst 450 is referred to the description on the step of forming the graphene 310 on the at least one side of the metal catalyst 350 of FIG. 3.

The graphene 410 may be formed on at least side of the metal catalyst 450. As shown in FIG. 4, the graphene 410 may be formed on both sides of the metal catalyst 450, but the formation of the graphene 410 is not limited thereto. The graphene 410 may also be formed on one side of the metal catalyst 450.

A carrier film 420 is combined with one side of the graphene 410 on which the metal catalyst 450 is formed.

A description on the carrier film 420 is referred to the description on the carrier film 120 of FIG. 1.

The metal catalyst 450 is removed.

The step of removing the metal catalyst 450 is not limited to a particular method. For example, the step of removing the metal catalyst 450 may be performed by an electrochemical separation method.

The electrochemical separation method is a method of separating the graphene from the metal catalyst by immersing a laminate of a metal catalyst and a graphene into an electrolyte solution and applying a voltage to the laminate. The electrochemical separation method is used to separate a graphene formed on both sides of the metal catalyst such that all of the separated graphene may be used.

The electrolyte solution may include at least one selected from NaOH, $Na_2CO_3$, $Na_3PO_4$, $Na_2SiO_3$, and sodium silicate, but the electrolyte solution is not limited thereto.

The voltage may be about 3 V to about 30 V, the voltage is not limited thereto.

A composition for preparing graphene including a nitrogen-containing organic compound, an oxidizing agent, and an acid is applied to a laminate of the carrier film 420 and the graphene 410, and the graphene 410 is doped with the composition for preparing graphene to obtain a doped graphene 430.

The composition for preparing graphene is used such that a lowered sheet resistance value of the doped graphene 430 may be maintained for a long time.

A description on the step of doping the graphene 410 to obtain the doped graphene 430 is referred to the description on the step of doping the graphene 110 to obtain the doped graphene 130 of FIG. 1.

The doped graphene 430 is transferred onto a target film 440.

To transfer the doped graphene 430 onto the target film 440, a method of combining the laminate of the graphene 410 and the carrier film 420 with the target film 440 is referred to the description of FIG. 1.

A description on the target film 440 is referred to the target film 140 of FIG. 1.

Hereinbefore, the method of preparing graphene is described by referring to FIGS. 1 to 4, but is not limited thereto.

Hereinafter, one or more embodiments will be described in more detail with reference to the following examples. However, these examples are for illustrative purposes only and are not intended to limit the scope of the one or more embodiments.

Example 1

A 35 μm copper (Cu) plate was charged into a CVD furnace. After flowing $CH_4$ into the furnace in a flow rate of about 30 standard cubic centimeters per minute (sccm) at a temperature of about 1,000° C. for about 5 minutes, the Cu plate was cooled to a temperature of about 600° C. in a cooling rate of about 60° C./min, and then, cooled to about room temperature in a cooling rate of about 40° C./min in a $H_2$ atmosphere, thereby forming graphene on Cu.

A laminate of Cu and graphene was immersed into an aqueous 4 wt % $(NH_4)S_2O_8$ solution for about 120 minutes, thereby removing Cu and obtaining graphene.

The graphene obtained therefrom was immersed into a composition including 9 wt % of imidazole, 3 wt % of $H_2O_2$, 9 wt % of $H_2SO_4$, and a balance of water for about 60 minutes, thereby obtaining doped graphene.

Example 2

A 35 μm Cu plate was charged into a CVD furnace. After flowing $CH_4$ into the furnace in a flow rate of about 30 sccm at a temperature of about 1,000° C. for about 5 minutes, the Cu plate was cooled to a temperature of about 600° C. in a cooling rate of about 60° C./min, and then, cooled to about room temperature in a cooling rate of about 40° C./min in a $H_2$ atmosphere, thereby forming graphene on Cu.

The graphene was immersed into a composition including about 9 wt % of imidazole, 3 wt % of $H_2O_2$, 9 wt % of $H_2SO_4$, and a balance of water for about 15 minutes, thereby removing Cu and doping obtaining the graphene at the same time, and then, obtaining doped graphene.

Comparative Example

A 35 μm Cu plate was charged into a CVD furnace. After flowing $CH_4$ into the furnace in a flow rate of about 30 sccm at a temperature of about 1,000° C. for about 5 minutes, the Cu plate was cooled to a temperature of about 600° C. in a cooling rate of about 60° C./min, and then, cooled to about room temperature in a cooling rate of about 40° C./min in a $H_2$ atmosphere, thereby forming graphene on Cu.

A laminate of Cu and graphene was immersed into an aqueous 4 wt % $(NH_4)S_2O_8$ solution for about 120 minutes, thereby removing Cu and obtaining graphene.

The graphene obtained therefrom was vapor-doped with about 70 wt % of $HNO_3$ for about 3 minutes, thereby obtaining doped graphene.

Evaluation Example

The graphenes prepared in Examples 1 and 2 and Comparative Example were subjected to measure sheet resistance values and changes in the sheet resistance values over time.

The sheet resistance values are average values for sheet resistance values measured at about 143 measuring points that are automatically selected by using an automatic sheet resistance meter (available from Dasol ENG). The measured results are shown in Tables 1 and 2 below.

TABLE 1

|  | Example 1 | Example 2 | Comparative Example |
|---|---|---|---|
| Sheet resistance value* (Ω/sq) | 280 | 240 | 400 |

*Note that the sheet resistance values above were measured in 48 hours after doping the graphene

TABLE 2

|  | Before doping | After doping | One day after doping | Two days after doping | Three days after doping | Four days after doping | Five days after doping |
|---|---|---|---|---|---|---|---|
| Example 1 (Ω/sq) | 510 | 275 | 283 | 281 | 271 | 287 | 277 |
| Example 2 (Ω/sq) | —** | 245 | 242 | 251 | 247 | 238 | 240 |
| Comparative Example (Ω/sq) | 512 | 289 | 409 | 460 | 479 | 488 | 493 |

**Note that due to simultaneous occurrence of the removal of the metal catalyst and the doping of the graphene in Example 2, a sheet resistance value measured before doping the graphene was not separately measured.

Referring to Table 1, it was confirmed that sheet resistance values of the graphenes could be lowered by using a composition including a nitrogen-containing organic compound represented, an oxidizing agent, and an acid, thereby doping graphenes with the nitrogen-containing organic compound. In addition, it was confirmed that the sheet resistance values of the graphenes can also be lowered by removing the metal catalyst and doping the graphenes at the same time.

Referring to Table 2, it was confirmed that the lowered sheet resistance values of the graphenes could be maintained for a long time position including a nitrogen-containing organic compound, an oxidizing agent, and an acid.

As described above, according to the one or more of the above exemplary embodiments, graphene having a low sheet resistance value and a long holding time of the low sheet resistance value may be provided.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. Graphene comprising a nitrogen-containing organic compound wherein the nitrogen-containing organic compound is chemically and/or physically bonded to a surface of the graphene and at least one selected from: an imidazole and a benzimidazole, and wherein the graphene does not comprise a substituted imidazole, a substituted benzimidazole, and a benzoxazole, wherein the graphene has a sheet resistance value more than 0 Ω/sq to 300 Ω/sq, and wherein the graphene is prepared by a method comprising: doping graphene with a composition for preparing graphene to obtain doped graphene, the composition for preparing graphene comprising the nitrogen-containing organic compound, an oxidizing agent, and an acid.

* * * * *